United States Patent [19]

Kutolowski

[11] Patent Number: 5,381,012
[45] Date of Patent: Jan. 10, 1995

[54] COLLIMATOR TRANSFER SYSTEM FOR A NUCLEAR CAMERA

[75] Inventor: Paul C. Kutolowski, Hudson, Ohio

[73] Assignee: Summit World Trade Corp., Hudson, Ohio

[21] Appl. No.: 169,192

[22] Filed: Dec. 20, 1993

[51] Int. Cl.⁶ .............................................. G01T 1/161
[52] U.S. Cl. .................................. 250/363.1; 378/147; 378/148
[58] Field of Search .................. 250/363.10; 378/147, 378/148

[56] References Cited

U.S. PATENT DOCUMENTS

| | | | |
|---|---|---|---|
| 4,865,284 | 9/1989 | Gosis et al. | 250/363.1 X |
| 5,097,131 | 3/1992 | Plummer et al. | 378/148 X |

FOREIGN PATENT DOCUMENTS

| | | | |
|---|---|---|---|
| 3508633 | 9/1985 | Germany | 378/148 |
| 59-180476 | 10/1984 | Japan | 250/363.10 |

Primary Examiner—Constantine Hannaher
Assistant Examiner—Edward J. Glick
Attorney, Agent, or Firm—Frank J. Nawalanic

[57] ABSTRACT

A transfer system is provided to effect collimator change out for a medical nuclear camera. The system includes a rectangular lead collimator frame into which the collimator is mounted. The collimator frame has an outer peripheral edge and an inner peripheral edge, the peripheral edges defining the collimator thickness. A transfer cart has a C-shaped transfer frame carrying top, bottom and side supports. The top and bottom supports have spring biased locking discs protruding therefrom which are adapted to contact and lock into contact grooves formed into the collimator frame's outer peripheral edge at its top and bottom thus encapsulating the collimator frame within the transfer cart frame for movement of the camera to storage and vise-versa. An especially configured storage rack is provided which has vertically extending, rack modules for storage/retrieval of the collimators. The bottom support of the cart's transfer frame is vertically movable to permit the transfer frame to tightly engage and release the collimator frame for camera application, while also permitting limited vertical movement of the collimator frame for storage deposit and retrieval.

31 Claims, 6 Drawing Sheets

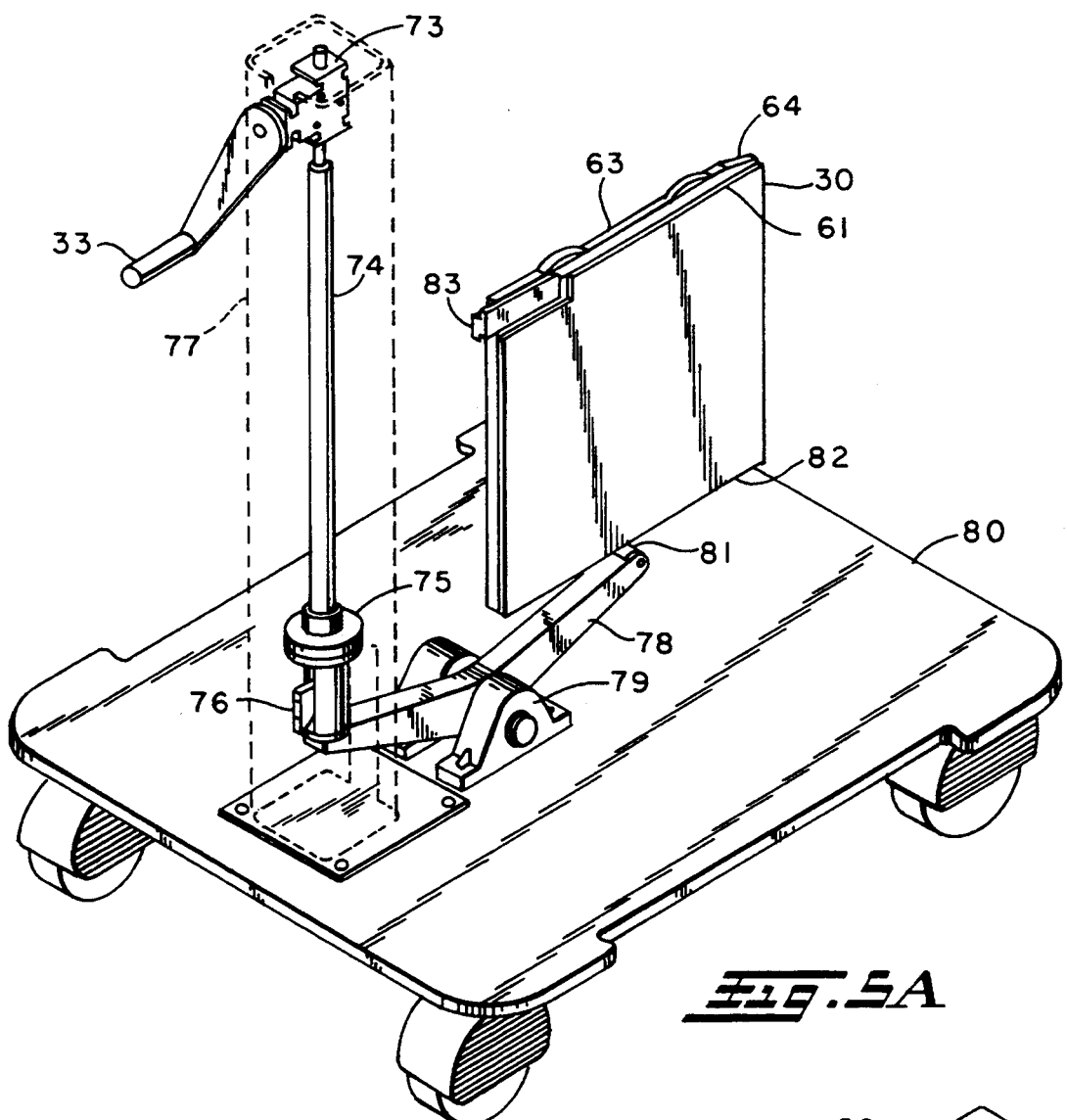
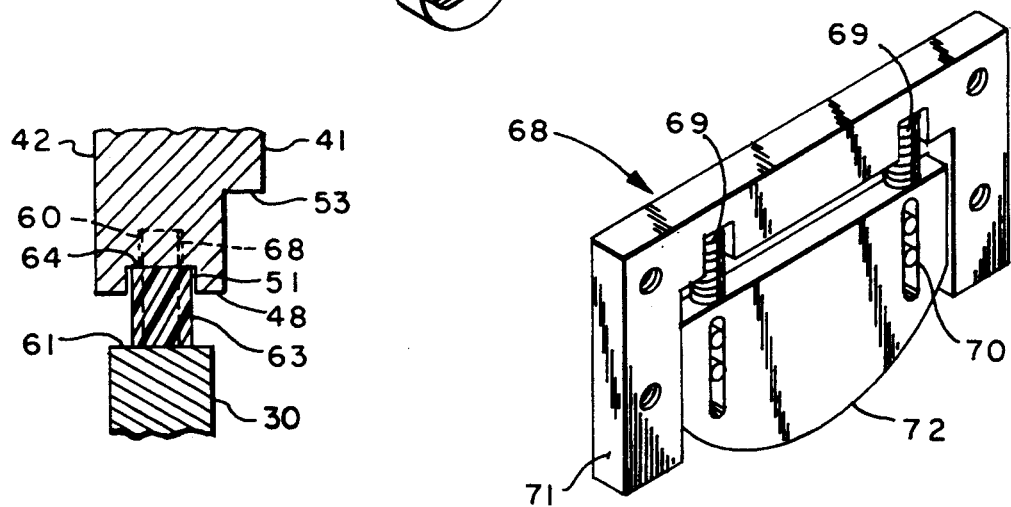

COLLIMATOR TRANSFER SYSTEM FOR A NUCLEAR CAMERA

This invention relates generally to nuclear cameras used in the medical field and more particularly to a transfer system for changing out the collimator used in the camera.

The invention is particularly applicable to and will be described with the specific reference to an integrated system in which collimators are stored, retrieved and applied to the camera. However, those skilled in the art will recognize that certain components of the system, such as the transfer cart, have application and utility apart from the system.

BACKGROUND

Nuclear cameras are used in the medical field for locating tumors or other biological abnormalities. A radioactive isotope combined in a suitable compound is either injected into the blood stream of the patient or is ingested orally. Certain compounds or elements are taken up preferentially by tumors or by specific organs of the patients body such as iodine in the thyroid gland. As the radioactive isotope disintegrates, gamma rays are ejected from the location in which the compounds or elements are concentrated. The gamma-ray or nuclear camera receives the rays, converts them to light and constructs scintigrams or scintiphotos which show the tumor or abnormalities in the organ.

More specifically, the nuclear camera includes a collimator which is a lead plate with pin holes which permits gamma rays to pass through it only when the rays are parallel to the pin holes in the lead. The gamma rays then strike a crystal, such as a sodium iodide crystal, which scintillates or converts the gamma rays to light and the light is transferred by light tubes to photomultiplier tubes which convert the light to electrical signals. The electrical signals are subsequently digitized and analyzed through appropriate algorithms to determine the intensity and direction of the gamma rays which are then projected onto a cathode ray tube. Different isotopes produce gamma rays having different energy levels. The thickness of the collimator is ideally sized to correlate with the energy levels of the gamma rays produced by the radioactive compound. If the collimator is too thick, an insufficient number of gamma rays will pass through the pin holes to permit satisfactory reconstruction of an accurate picture. If the collimator is too thin, angular gamma rays will have sufficient energy to pass through the pin holes distorting the scintiphoto.

Generally speaking, the nuclear camera art has developed to the point where at least three different collimators of varying thicknesses are supplied with the camera. For purposes of this invention, the collimators can be classified according to thickness as thin, medium or thick. The collimator is mounted or encapsulated within a frame which, in turn, is removably fastened to the lead shielded camera housing containing the crystal, light tubes and photomultipliers. The cameras, usually two, are mounted to a gantry which straddles the patient. The gantry is usually of the type that not only permits the cameras to move into or away from the patient and travel longitudinally along the length of the patient's body, but also to circumferentially rotate from horizontal to vertical positions about the patient.

Heretofore, when the collimator had to be changed, a cart with prongs resembling a tow motor truck was used. The camera was positioned in it's upper horizontal position and the prongs were adjusted to rest on the face side of the collimator. The fasteners holding the collimator frame to the camera housing were unscrewed and the cart, with the collimator lying face down on the prongs, moved away. The prongs then had to be lowered a significant distance and the collimator lifted off for placing into a storage shelf, whereupon a new one was then laid on the prongs and the process reversed.

It can be appreciated that this transfer arrangement is likely to damage the collimator. Collimators are constructed of leaves of lead foil assembled into a tight honeycomb pattern. Any accidental jarring could deform the lead foil ruining the pin holes in the area where the collimator might have been jarred. This jarring can occur when the collimator is "dropped" during transfer to the prongs such as when the collimator is removed or dropped onto the shelf. Also, because the collimator simply lies horizontally on a storage shelf, face side down, it is not that uncommon for the collimator to have been ruined by liquid spills such as can occur when the clinician places a coffee cup on the exposed back side of the collimator. Collimators are expensive items and are designed for the life of the camera. It is somewhat surprising that a relatively large replacement market for collimators exists. Obviously, the collimators are damaged during removal, storage and retrieval.

Apart from the damage, or probability of damage, done to the collimators by the transfer techniques heretofore employed, it is also to be appreciated that collimators weigh anywhere from 100 to 300 lbs. Since the collimator has to be physically moved, even to permit fastening to the camera housing, the chore can be difficult for the clinician especially when a high proportion of nuclear camera clinicians are women. In many instances, additional technicians have to be used to effect the transfer under the direction of the nuclear camera clinician.

Also, the transfer time is simply long. For instance, the cart's transfer prongs have to be cranked from a floor level to a relatively high horizontal camera level to simply position the prongs which then have to be returned to the low level, etc.

The cumulative effect of the problems discussed above is that many hospitals will use only the medium collimator and the doctors will simply have to interpret the scintiphoto as best they can. Alternatively, the hospitals will schedule the patients in accordance with the gamma ray energy levels of the radio isotope compounds injected into or ingested by the patients. However, emergency or critical cases disrupt the schedule. In general, because of the time, the difficulty and the damage probability attributed to changing the camera's collimator, the collimator is simply not changed as often as it should be.

SUMMARY OF THE INVENTION

Accordingly, it is a principal object of the present invention to provide a transfer system which overcomes the defects of the prior art transfer techniques heretofore used to change the collimator of a nuclear camera.

This object, along with other features of the invention, is generally achieved by a transfer mechanism or system for changing the collimator of a nuclear camera which includes a rectilinear collimator frame in which the collimator is mounted. The frame has a thickness defined by an outer edge surface which extends from one side or face of the frame and an inner edge surface which extends from the opposite side or face of the frame. The inner edge is disposed closer to the center of the frame than is the outer edge surface. A storage rack is provided for removably storing the collimator in a vertical position by resting and clamping the collimator on the outer edge surface. Similarly, a transfer cart is provided for releasably carrying the collimator in a vertical position by carrying the collimator frame in a clamped, secure position on its outer edge surface. Thus, the collimator is securely stored, transported, applied and removed to the nuclear camera in a lowered, vertical position. Because the camera's gantry always positions the camera, when vertical, close to the ground, the collimator is always at a lower position to ground when stored, transported, applied, etc., than the position it previously had in the prior art transfer systems making for a faster, more secure and safe system.

In accordance with another aspect of the invention, the outer edge of the frame has top, bottom and side outer edge surfaces with a groove formed in the top and bottom edge surfaces. The hand pushable transfer cart has a generally C-shaped collimator transfer frame and the transfer frame has generally parallel top and bottom supports and a side support which is generally perpendicular to the top and bottom supports. A spring biased locking disc mechanism is provided which includes a top spring biased locking disc which extends from the top support and a bottom spring biased locking disc which extends from the bottom support. After the camera is rotated to its lowered vertical position, the locking disc mechanism slidingly engages the top and bottom frame edge surfaces as the transfer cart is moved onto the collimator frame until snap locking the locking disc into the top and bottom grooves thereby retaining the collimator frame within the cart's transfer frame. When the collimator frame is unfastened from the camera's housing for transport by the cart to the storage rack, the collimator frame's movement relative to the transfer frame is fixed since each locking disc within its groove physically prevents lateral movement, such as tilting or tipping of the collimator while the spring bias prevents the collimator frame from moving longitudinally relative to the transfer cart's transfer frame. In accordance with another aspect of the invention, the transfer cart's transfer frame top and side supports include an L-shaped support guide having a base surface and a side guide surface which extends generally perpendicular therefrom. Each side guide surface is adapted to contact the same side surface of the collimator frame. Additionally the bottom outer edge surface of the collimator frame is formed with a central channel recess extending the length thereof. The bottom support of the transfer cart includes a vertically-movable, bottom lift plate, the upper edge of which has a rectangular polyethylene support strip centrally positioned therein which slidingly contacts the collimator frame bottom recess. The side guide surfaces and support strip permit the transfer cart to move the locking discs into alignment with the grooves in the collimator frame without undue effort expended in positioning the transfer cart. Preferably the locking discs are shaped with a circular edge protruding from the base surface of the top support and the support strip on the lift plate. The grooves are shaped circularly to conform to the outermost portion of the locking disc circular edge. This shape permits initial sliding contact with a secure, positive lock action when the locking disc snaps fully into engagement with the contact grooves.

In accordance with yet another important aspect of the invention, the dimensional relationship of the transfer cart's transfer frame is such that when the collimator is positioned onto the cart's transfer frame, the collimator's weight is supported on the support strip of the bottom lift plate of the transfer cart's frame while the base surface of the top support guide is initially slightly spaced from the collimator frame's top edge surface. The cart is then provided with a raising and lowering mechanism which can raise or lower the bottom lift plate relative to the top support a limited distance which does not significantly exceed, if at all, the travel of the spring biased locking disc. Importantly, when transferring the collimator frame to the cart, once the locking discs snap into the locking groove, the bottom support can be raised to increase the spring bias of the locking disc until, if desired, the base surface of the top support contacts the top outer edge surface of the collimator frame to positively prevent any longitudinal movement of the collimator frame relative to the transfer frame thus insuring safe transfer of the collimator. The bottom support can then be lowered to reduce the spring pressure of the locking disc against the collimator frame to permit easy positioning of the transfer cart into alignment with the collimator frame for either camera removal or storage retrieval. Significantly, the vertical alignment of transfer frame relative to collimator frame does not require a long travel distance to assure fast transfer.

In accordance with a still further aspect of the invention, the system includes a storage rack having at least one rack module. The rack module has a vertical column from which extends a top guide and a bottom support. The rack's top guide includes a spring biased locking disc. A second contact groove is provided in the top outer edge surface of the collimator frame to receive the rack module's locking disc when the frame is positioned in the rack module. The bottom support of the rack module includes a right and left hand bottom support guide spaced from one another a distance at least equal to the width of the lift plate's support strip and on which the bottom outer edge surface of the collimator frame rests when the collimator is situated in the storage rack. The lift plate is raised or lowered to release or apply transfer cart spring pressure when the collimator is to be inserted into or removed from the storage rack. Additionally, the storage rack includes preferably a plurality of rack modules each of which has a plurality of spaced fastener holes in alignment with one another whereby the rack modules may be joined side-by-side. A similar alignment of fastener holes is located on a right hand outrigger support stand and a left hand outrigger support stand which are attached to the rack module whereby the rack module column and the two support stands form a three point solid support for the storage rack.

In accordance with another specific feature of the invention, the rack's right and left hand support guides are spring biased towards one another and the leading end of each support guide is tapered to always receive therebetween the polyethylene support strip of the lift plate on the transfer cart. Forward motion of the transfer cart into the rack module spreads the right and left hand support guides apart so that one size rack module is able to accommodate either thick or thin collimators.

In addition there is a top rack guide as well as the bottom rack guide i.e., the right and left hand support guides, to provide secure storage of the collimator.

It is thus an object of the invention to provide a transfer cart in combination with an especially designed collimator frame which permits the collimator of a nuclear camera to be easily removed, applied, transferred and stored.

It is yet another object of the invention to provide a transfer cart for a nuclear camera collimator which positively grasps the collimator in a secure manner to permit safe transfer of the collimator.

It is another object of the invention to provide a modular storage rack for storing nuclear camera collimators.

It is an important object of the invention to provide an integrated system for changing the collimator of the nuclear camera in which collimator frame, transfer cart and storage rack are dimensionally designed to permit a safe, secure and easy method of changing, storing and transferring the collimator of a nuclear camera.

Still yet another object of the invention is to provide a collimator transfer system capable of being efficiently and totally operated by one technician.

Yet another object of the invention is to provide a transfer system for the collimator of a nuclear camera which permits fast collimator changeovers to alleviate patient scheduling problems.

It is still yet another object of the invention to provide a simple, efficient and economical nuclear camera collimator transfer system.

These and other objects of the invention will become apparent to those skilled in the art upon reading the Detailed Description of the Invention set forth below, taken together with the drawings which will be described in the next section.

BRIEF DESCRIPTION OF THE DRAWINGS

The invention may take physical form in certain parts and arrangement of parts, a preferred embodiment of which will be described in detail herein and illustrated in the accompanying drawings which form a part hereof and wherein:

FIG. 3A is a partial view taken generally along lines 3A—3A of FIG. 3 showing the collimator resting on the storage rack.

FIG. 5A is a perspective view of the transfer cart similar to FIG. 5 but showing only the lift portion of the cart;

FIG. 5B is a partial edge view taken generally along lines 5B—5B of FIG. 5 showing the collimator frame resting on the bottom life plate; and FIG. 6 is a detailed perspective view showing the locking disc of the invention.

DETAILED DESCRIPTION OF THE INVENTION

Figure 1:
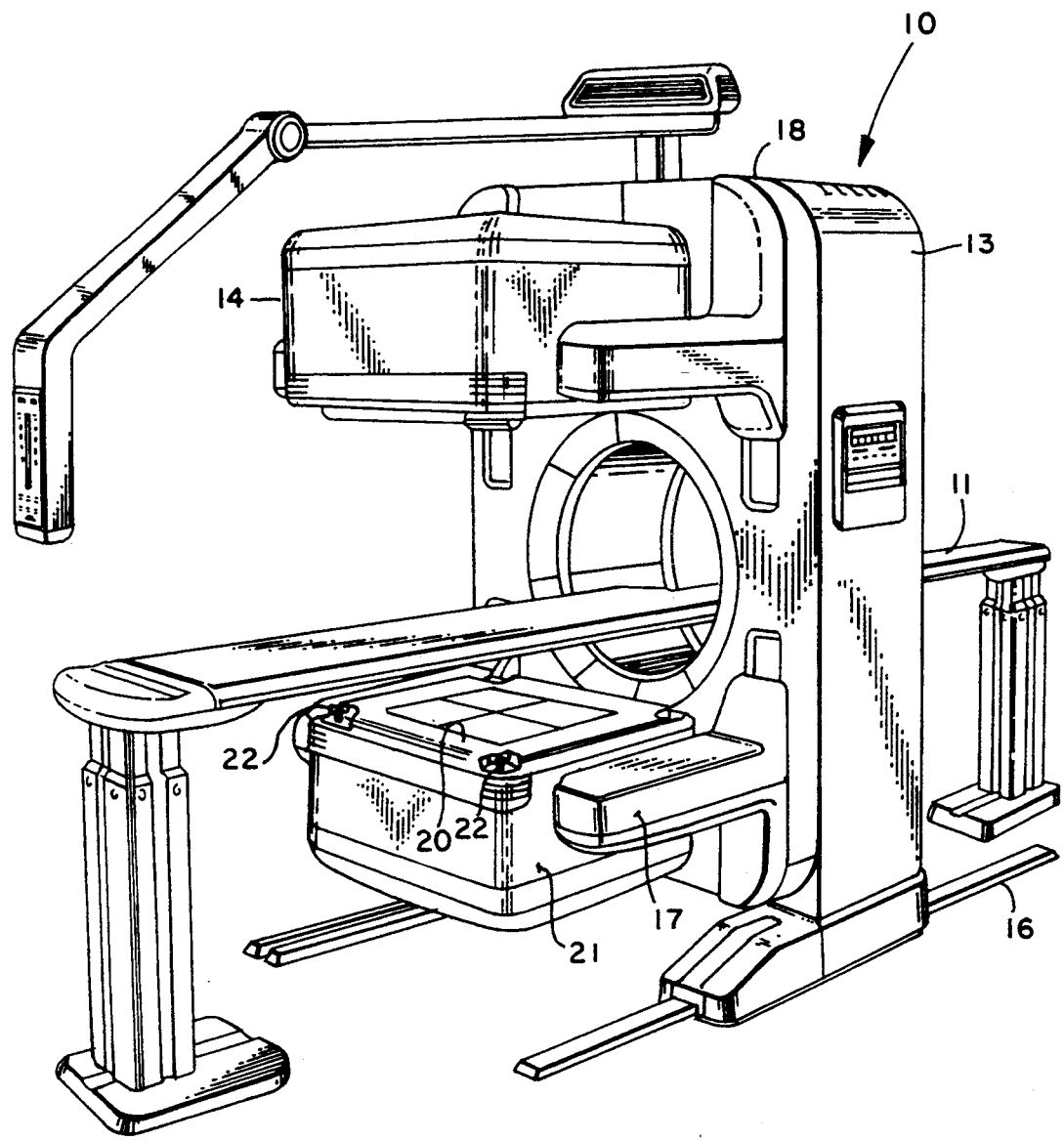
FIG. 1 is a perspective view of a nuclear camera with a collimator applied to the camera housing.

Referring now to the drawings wherein the showings are for the purpose of illustrating a preferred embodiment of the invention only and not for the purpose of limiting same, there is shown in FIG. 1 a nuclear camera system 10 which includes a table 11 on which the patient lies and a gantry 13 carrying two nuclear cameras 14. Gantry 13 is movable on tracks 16 to position cameras 14 along the length of the patient. In addition, cameras 14 are movable by arms 17 forward or away from the patient for camera focusing. Finally, camera arms 17 are carried by a rotatable frame 18 within gantry 13 which permit cameras 14 to rotate about the body of the patient for taking picture "slices" for tomographic, three-dimensional pictures. In FIG. 1, cameras 14 are illustrated in their horizontal position, it being understood that rotatable frame 18 will rotate cameras 14 90° into a vertical position for collimator exchange. Also shown in FIG. 1 is the collimator 20 of camera 14 which is secured to collimator housing 21 by four (4) hand tightened, swing-away bolt fasteners 22. It should be appreciated that the prior art transfer system described above would remove collimator 20 on uppermost camera 14 in the FIG. 1 position. Accordingly, the prior art transfer system required removal of patient table 11 to position the tow motor type truck under uppermost camera 14. In accordance with the invention, rotatable frame 18 will rotate cameras 14 into their vertical position where collimator 20 of one of the cameras 14 can be removed. The vertical position is significantly lower to the ground than the horizontal position.

Figure 2:
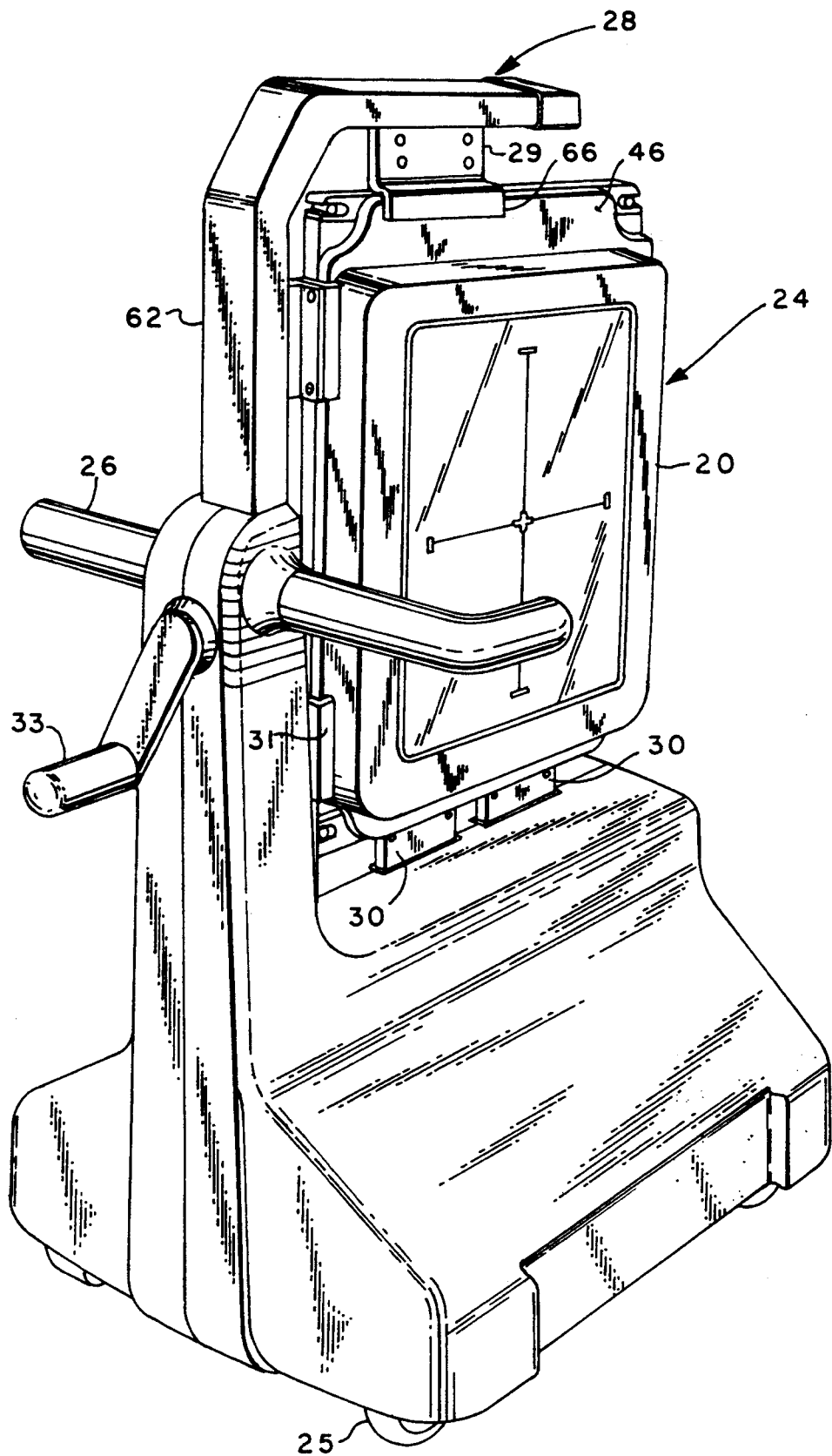
FIG. 2 is a perspective view of a transfer cart of the invention containing a collimator.

Referring now to FIG. 2, there is shown a transfer cart 24 for carrying collimator 20. Transfer cart 24 can be hand pushed/pulled on swivelable wheels 25 by means of a cross-bar 26. Transfer cart 24 includes a C-shaped transfer frame 28 containing a top support 29, a bottom support or lift plate 30 and two side supports 31 which securely hold collimator 20. A centrally positioned crank 33 is provided for raising and lowering bottom lift plate 30 in a manner which will be described.

Figure 3:
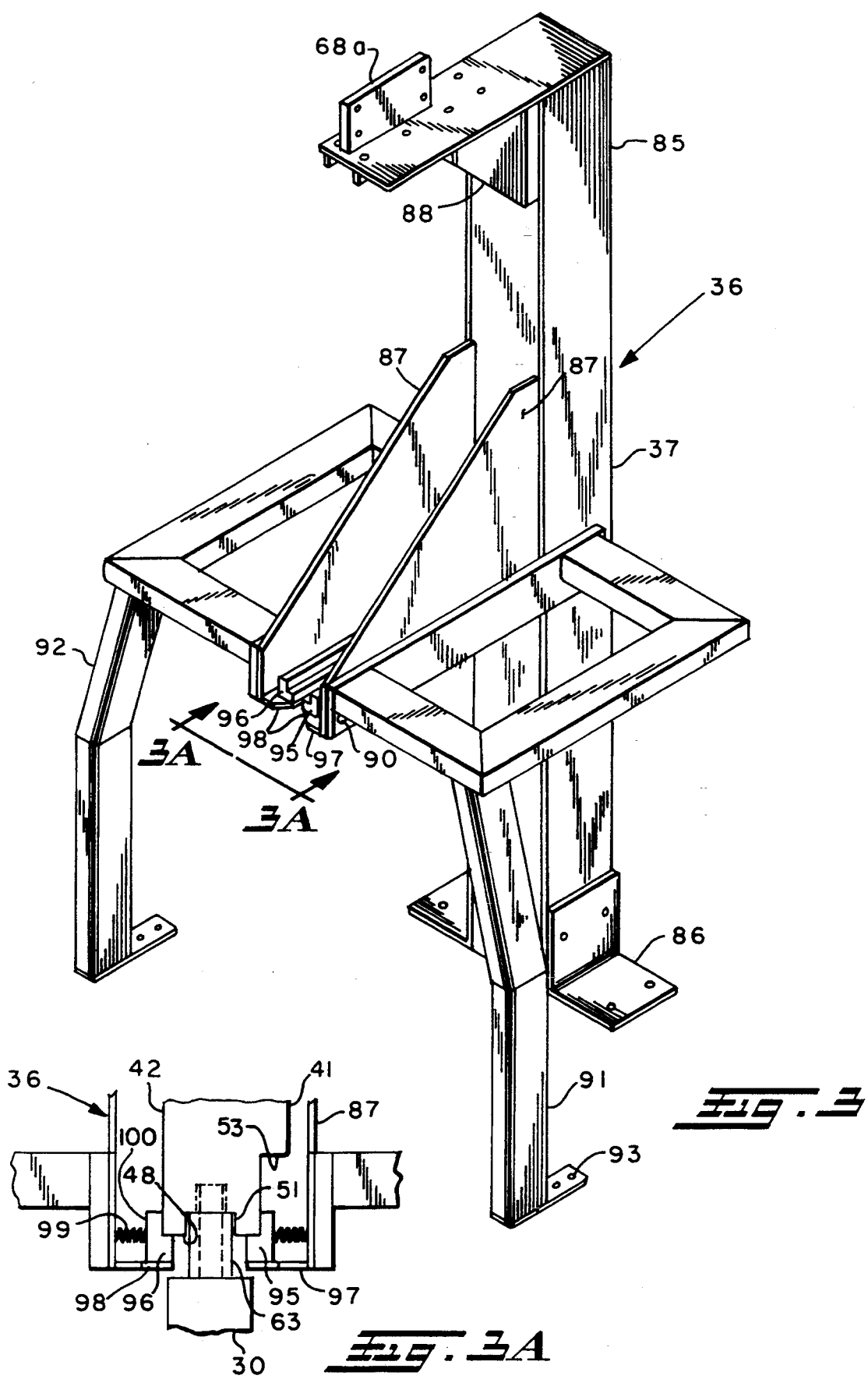
FIG. 3 is a perspective view of the storage rack for storing collimators.

A modular storage sack 36 is shown in FIG. 3 and includes at least one and preferably a plurality (only one shown) of vertically extending rack module 37 to receive a stored collimator 20.

In general, the transfer system operates by activating gantry 13 to position nuclear camera 14 in a vertical position. Transfer cart 14 is then wheeled into position to engage collimator 20 by top support 29, bottom lift plate 30 and side support 31. Fasteners 22 are then disengaged and the cart wheeled to storage rack 36 where collimator 20 is stored in rack module 37. Transfer cart 24 is then moved or indexed to another rack module 37 (not shown) for engaging another collimator between transfer cart top and side supports 29, 31 and bottom lift plate 30. The cart is then moved to, and the second collimator is positioned onto, nuclear camera 14. Fasteners 22 are secured to complete the collimator exchange and transfer cart 24 is disengaged from collimator 20. When transfer cart 24 engages collimator 20 and when transfer cart 24 disengages collimator 20, crank 33 may be actuated to raise or lower bottom lift plate 30 as described hereafter.

Figure 4:
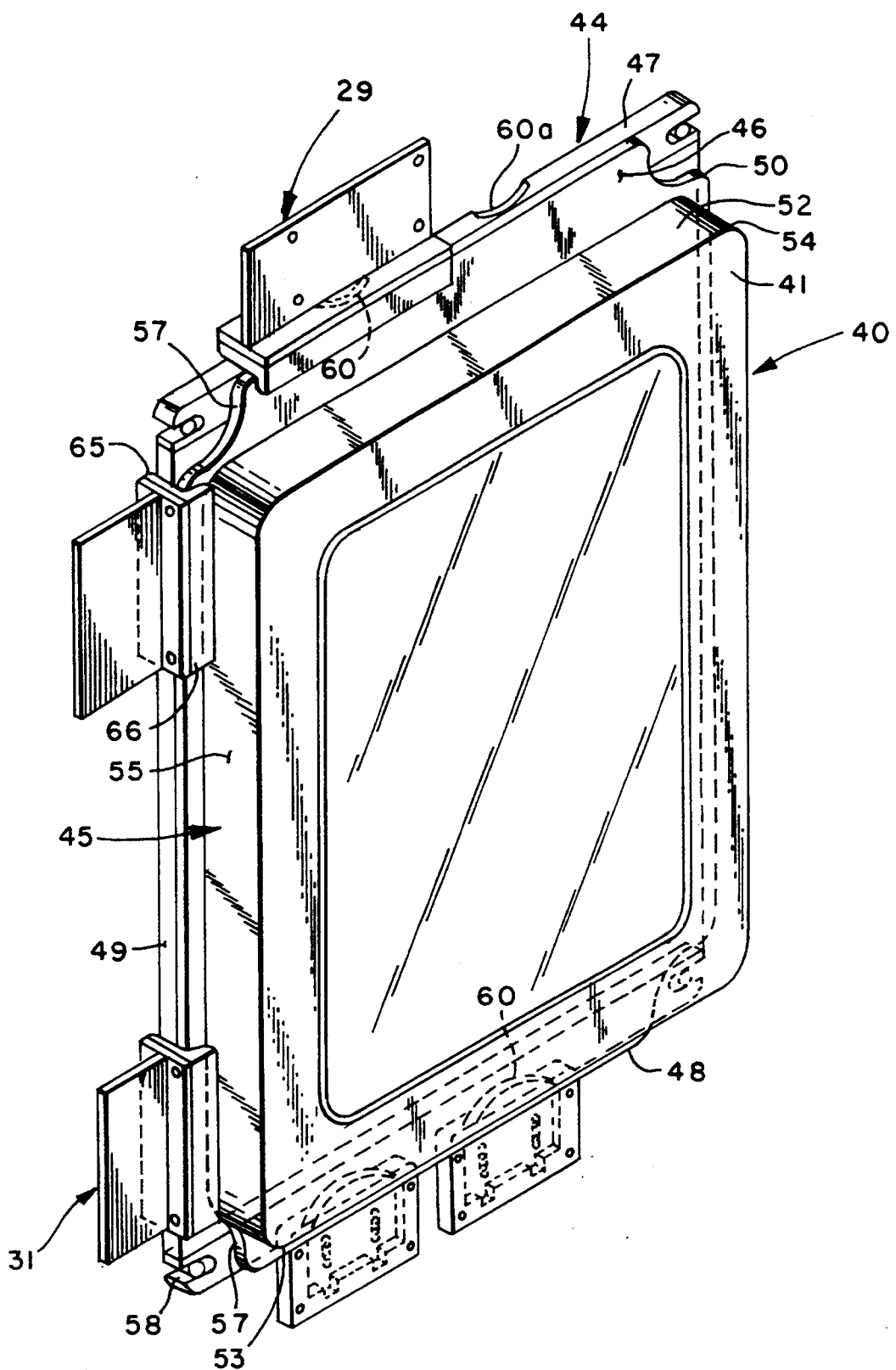
FIG. 4 is a perspective view of the collimator frame and the supports of the transfer cart.

Referring now to FIG. 4, there is shown a rectilinear, collimator frame 40 which is a lead casting. Collimator frame 40 has a patient facing or front side 41 and a collimator housing facing or back side 42 (not shown in FIG. 4 but partially shown in FIGS. 3A and 5B). Within collimator frame 40 there is placed a plexiglass plate (or any type of protective, transparent plate) adjacent front side 41, a conventional collimator as discussed above which is made from lead foil, and a clamp ring (not shown) which is adjacent the collimator's back side and secured in collimator frame 40 in any conventional manner. The actual physical construction or assembly of collimator 20 into collimator frame 40 is conventional and does not form part of the present invention and is not described further. It is sufficient to note for purposes of the present invention that collimator 20 is permanently encapsulated, or mounted, within collimator frame 40. Any number of mounting or fastening arrangements can be used to securely position or lock the collimator into frame 40. The thickness of collimator frame 40 will of course vary depending upon the energy level of the gamma rays which are to pass through collimator 20 which, in turn, determines the thickness of collimator 20. As noted above, collimator 20 thicknesses will be referred to herein as thin, medium or thick with "thin" being the thinnest collimator 20 in collimator frame 40. The invention will be explained with reference to the thinnest collimator frame 40. As noted above, the weight of collimator 20 varies anywhere from about 100 lbs. For a thin collimator up to about 400 lbs for a thick collimator.

In the preferred embodiment, collimator frame 40 is rectangular and its thickness is defined by or equal to a peripheral outer edge 44 and a peripheral inner edge 45. For definitional purposes, outer edge 44 has a top outer edge surface 47 and a bottom outer edge surface 48 and generally parallel side outer edge surfaces 49, 50 which are generally perpendicular to top and bottom outer edge surfaces 47, 48. Inner edge 45, likewise, has top and bottom, generally parallel, inner edge surfaces 52, 53 and generally parallel side inner edge surfaces 54, 55. Inner edge 45 is positioned towards the center of collimator 20. Inner edge 45 extends from collimator front side 41 and terminates at a flat side surface 46. Outer edge 44 extends from collimator's back side 42 and terminates at flat side surface 46.

The corners of outer edge 44 are recessed as at 57 and slotted as at reference numeral 58 for receiving swing bolt fasteners 22 which swivel into slots 58 for locking collimator frame 40 to collimator housing 21 and pivot away from or out of slot 58 when collimator frame 40 is removed from collimator housing 21. The depth of recess 57 is such that the hand tightenable wing nut of swing bolt fastener 22 does not extend beyond flat side surface 46.

As best shown in FIG. 5B collimator frame outer bottom edge surface 48 is preferably formed with a centrally located, channel shaped recess 51 cut into outer bottom edge surface 48 which runs the length of outer bottom edge surface 48. The reason for recess 51 will be explained below.

As shown in FIG. 4, top support 29 of transfer frame 28 engages the collimator frame top outer edge surface 47 and flat side surface 46. Bottom lift plate 30 engages the collimator frame bottom outer edge surface 48 (as shown in FIG. 5B). Finally, side supports 31 engage side outer edge surface 49 and flat side surface 46. Within top outer edge surface 47 there is formed two circular contact grooves 60 and two similar circular contact grooves 60 are formed in bottom outer edge surface 48. Contact grooves 60 are formed in the middle of the width of the collimator frame top and bottom outer edge surfaces 47, 48. While there can be any number of contact grooves 60, for the invention to work, there must be at least one top and one bottom contact groove 60. Also, it is desirable for positioning and stability purposes, that contact grooves 60 be placed lengthwise at least midway from the collimator's side outer edge surface which is opposite to the side that is engaged by cart's side supports 31.

Figure 5:
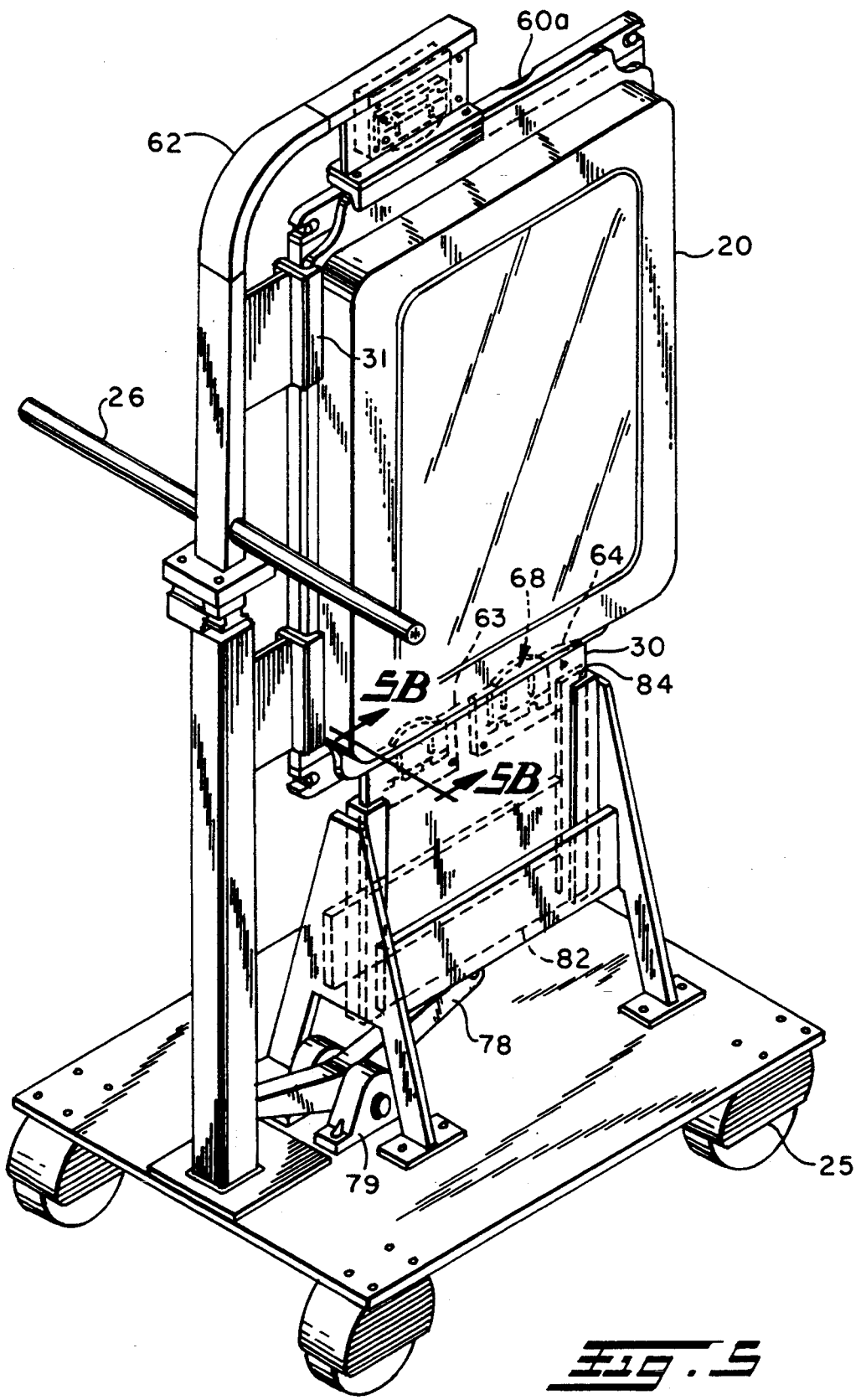
FIG. 5 is a perspective view of the transfer cart with the outer covering of the cart removed.

Referring now to FIGS. 2, 4 and 5, transfer cart 24 has an L-shaped mast arm 62 to which top support 29 and two side supports 31 are rigidly fixed. Each cart support 29 and 31 is shaped somewhat like a structural angle and has a generally flat base surface 65 from which extends at right angles thereto, a guide surface 66. Accordingly, base surface 65 of each support 29 and 31 is adapted to contact outer edge 44 and guide surface 66 of each support 29 and 31 is adapted to contact flat side surface 46 of collimator frame 40. It should be clear from the description of collimator frame above, that the center of gravity of collimator 20, is outside supports 29, 30 and 31. Thus, guide surfaces 66 not only function to guide transfer frame 28 into alignment with collimator frame's outer edge 44, but, also serve as stabilizing stop surfaces, (i.e., top support 29 in collimator frame 40,) to positively prevent collimator frame 40 from tipping or falling out of transfer frame 28.

Lift plate 30 as best shown in FIGS. 5A and 5B has a flat top surface 61 from which extends a thinner or less wide rectangular support strip 63 of high density polyethylene. Support strip 63 can be applied to top surface 61 by countersunk fasteners (not shown). Support strip 63 is chamfered at its leading end 64. When transfer cart 24 holds collimator frame 40, frame recess 51 rests on support strip 63 and a space exists between lift plate's top surface 61 and collimator's bottom outer edge 48 for reasons which will be clear later. By making support strip 63 from polyethylene with a chamfered leading end 64, bottom lift plate 30 can easily slide into frame recess 51 and provides a mortise joint-type connection which assists in resisting tipping of collimator frame 40.

Referring now to FIGS. 5 and 6, movably extending from within top support 29 is a locking disc 68 and movably extending from bottom support lift plate 30 are two locking discs 68 (which can be functionally referred to as "biscuits"). Each locking disc 68 is biased outwardly beyond base surface 65 of top support 29 and beyond support strip 63 of bottom lift plate 30 by springs 69. Stop dowel pins 70 limit the travel at which locking disc 68 can protrude from base surface 65 or support strip 63. That portion of locking disc 68 which protrudes or extends from base surface 65 or through support strip 63 is configured arcuately or generally circular as at reference numeral 72 to generally match the shape of contact grooves 60. Locking discs 68 are guided in their motion by being positioned within a C-shaped guide 71 which, in turn, is fastened either within top support 29 or bottom lift plate 30.

As thus far described, transfer cart 24 can operate to transfer collimator frame 40 to and from nuclear camera 14. The clinicfan simply steers transfer cart 24 so that support guide surfaces 66 contact flat side surface 46 and support strip 63 slides within collimator recess 51. As guide surface 66 of top support 29 and support strip 63 guide transfer frame 28 onto collimator frame 40, protruding portions 72 of locking disc 68 retract. When side supports 31 begin to approach side outer edge surface 49, protruding portions 72 of all three locking discs 68 snap into contact grooves 60 to lock collimator frame 40 to C-shaped transfer frame 28. If collimator 20 is to be applied to camera 14, fasteners 22 are secured and transfer cart 24 simply wheeled away. If collimator 20 is to be removed from camera 14, fasteners or swing bolt fasteners 22 are removed and the fasteners swung out of the way so that transfer cart 24 with collimator frame 40 attached can be removed from camera 14. Support guide surfaces 66 and support strip 63 will prevent collimator frame from tipping and locking discs 68 within contact grooves 60 will maintain collimator frame 40 fixed to transfer frame 28. The weight of collimator 20 will rest on support strip 63 of bottom lift plate 30 and a slight clearance space will exist between top outer edge surface 47 and base surface 65 of top support 29. It is, of course, appreciated that the height of cart's top support 29 is fixed at the height of collimator frame's top outer edge surface 47 when camera 14 is rotated to its vertical position. Further, it should also be noted that the transfer system is designed to remove collimator 20 from one side. A different configuration of top and side supports 29 and 31 could be used (such as that shown for bottom lift plate 30) if it was deemed necessary to remove collimator 20 from either side of camera 10.

Those skilled in the art will recognize that as described thus far, the force required for the clinician to push transfer cart 24 into locking engagement with collimator frame 40 is a function of the force of springs 69. Accordingly, it is a specific feature of the invention to provide an adjustable spring force for all locking discs 68 by making bottom lift plate 30 vertically moveable. By moving bottom lift plate 30 downward during alignment with collimator frame 40, the spring force of all locking discs 68 is reduced while the snap action of locking disc 68 is retained. After transfer frame 28 is aligned and locked with collimator frame 40, bottom lift plate 30 is moved upwardly until base surface 65 of top support 29 engages or bottoms out against top outer edge surface 47. Collimator frame 40 thus becomes firmly and immovably grasped between top support 29 and bottom lift plate 30 and cannot be removed from transfer cart 24 until bottom lift plate 30 is lowered. In fact, the arrangement can be viewed as a "frame within a frame" because collimator frame 40 is truly releasably framed or captured within the cart's top, and side supports 29 and 31 and bottom lift plate 30. It is to be appreciated that, in contrast to the prior art systems, the total vertical movement under discussion is about equal to or slightly larger than total travel of springs 69. In the preferred embodiment, this is about $\frac{1}{4}''$ although other distances could be selected.

In the preferred embodiment, the raising and lowering mechanism to move bottom lift plate 30 and support strip 63 is a somewhat conventional, crank-screw arrangement, best shown in FIG. 5A. Crank 33 rotates a right angle gear box 73 which, in turn, rotates a vertically extending acme screw 74. Rotation of acme screw 74 raises or lowers an acme screw nut and flange assembly 75. Movement of flange assembly 75 is limited vertically and prevented from rotation by a limit assembly or plate 76 affixed to tube enclosure 77 housing gear box 73 and acme screw 74. Flange assembly 75 contacts (raises or lowers) one end of a rocker arm 78. Rocker arm pivots about a pillow block bearing 79 affixed to baseplate 80 of transfer cart 24. A rotatable cam follower 81 contacts a flat underside edge 82 of bottom lift plate 30 to raise or lower bottom lift plate 30. Several edge guides 83 (only one shown) attached to the sided of lift plate 30 fit within a C-shaped track 84 (shown in FIG. 5) to vertically guide bottom lift plate 30.

As noted above, the transfer system of the invention contemplates a specially designed storage rack 36 which is shown in FIG. 3. As noted above, storage rack 36 preferably includes a plurality of vertically extending rack modules 37 although only one rack module 37 is illustrated. Rack module 37 includes a vertically extending column 85 having a base plate 86 to be secured to the floor. Extending from column 85 is a pair of laterally spaced lower gussets or bottom support guides 87 and a pair of (only one shown in the drawings) upper gussets or top support guides 88, each spaced from one another a distance sufficient to receive the thickness of collimator frame 40. Extending between upper gussets is a locking disc which is designated 68a to distinguish from locking discs 68 on transfer cart 24. Locking disc 68a is adapted to snap into top contact groove which is designated 60a on collimator frame 40 and which is not engaged by the top locking disc 68 on transfer cart 24. Contact disc 60a biases collimator frame 40 into and holds collimator frame 40 within rack module 37.

Lower gussets 87 contain a plurality of fastener openings 90 for securing additional rack modules 37 side by side or securing a right hand outrigger support stand 91 or a left hand outrigger support stand 92. Each outrigger support stand 91, 92 has a base 93 for permanent attachment to a floor. Thus, each storage rack has one or more rack modules 37, a right hand support stand 91 and a left hand support stand 92, and all components are modularly secured to one another by a series of identically spaced and positioned fastener openings 90.

At the bottom of lower gussets 87 is a right hand bottom support guide 95 and an identical left hand bottom support guide 96, each of which rests on an angle brace 97 extending from lower gussets 87. Right and left hand bottom support guides 95, 96 extend the length of lower gussets 87 which is the length of collimator frame 40. Support guides 95, 96 are L-shaped as best shown in FIG. 3A and contacts bottom outer surface edge 48 of collimator frame 40 away from recess opening 51. The leading end of right and left hand bottom support guides is tapered or chamfered as shown by reference numeral 98 in FIG. 3. Paper 98 permits each bottom support guide 95, 96 to be spring loaded as schematically shown by reference numeral 99 in FIG. 3A to assure that an upstanding leg portion 100 of each support guide 95, 96 contacts collimator's back side 42 and front side 41. This spring loaded guide feature permits the width between lower gussets 87 to be set for the thickest collimator frame 40 while assuring that bottom support guides 95, 96 contacts bottom outer edge surface 48 of the thinnest collimator frame 40. A similar spring loaded arrangement (not shown) is or can be provided for upper gussets 88 (top support guides) to bias gussets 88 towards one another.

To store collimator 20 within storage rack 36, transfer cart 28 with collimator frame 40 locked thereto pushes collimator frame 40 between upper and lower gussets 88,87. Support strip 63 is caught by taper 98 and as transfer cart 28 pushes collimator 40 into rack module 37, left and right bottom support guides 95, 96 spread apart to their FIG. 3A position. When contact disc 86a snaps into contact groove 60a, collimator frame 40 is locked into rack module 37 in the same way it had been locked into transfer cart 28. Also, the snapping of locking disc 68a into contact groove 60a provides a telltale sign to the clinician that collimator frame 40 is now properly seated in storage rack 36. The clinician then rotates crank 33 and bottom lift plate 30 is lowered to reduce spring face 69 of locking discs 68 on transfer cart 28. Transfer cart 28 is then withdrawn from storage rack 36. The procedure is simply reversed to retrieve collimator 20 from storage rack 36. When crank 33 is actuated to raise bottom lift plate 30 upward, the weight of collimator 20 is supported by support strip 63 and the force of spring 69 of contact disc 68a will not be sufficient to prevent withdrawal of collimator 20 from storage rack 36.

An alternative construction would be to remove springs 99 and fix support guides 95, 96 to gussets 87 at a spaced distance corresponding to the thickness of collimator frame 40.

The invention has been described with reference to a preferred embodiment. Obviously, modifications and alterations will occur to those skilled in the art upon reading and understanding the detailed description set forth above. One such modification, which in fact was initially used on the transfer system, is to replace recess 51 and support strip 63 with two angle-shaped bottom supports similar to top support 29, each of which would contain a locking disc 68. Still another modification is to selectively use outer edge 44 of collimator frame 40 to transfer collimator 20 to and from transfer cart 24 while inner edge 45 can be used as a support surface for collimator in rack module 37 with lift plate 30 being used to lift collimator frame 40 from one edge to the other. This modification retains the vertical transfer, storage application features of the invention. It is intended to include all such modifications and alterations as coming within the scope of the present invention.

Having thus defined the invention, it is claimed:

1. A transfer system for changing the collimator of a nuclear camera rotatable by a gantry about the body of a patient, said transfer system comprising:
   a. a rectilinear collimator frame containing a collimator releasably secured to the face of said camera, said collimator frame having a top and bottom and side outer edge surfaces with at least one contact groove formed in said top and bottom edge surfaces;
   b. a hand pushable transfer cart having a generally C-shaped collimator transfer frame, said transfer frame having generally parallel top and bottom supports and a side support generally perpendicular to said top and bottom supports;
   c. spring biased locking disc means including at least one top spring biased locking disc extending from said top support and at least one bottom spring biased locking disc extending from said bottom support for slidingly engaging said top and bottom edge surfaces when said camera is rotated to position its collimator in a vertical position by movement of said transfer cart until snap locking said locking discs in said top and bottom contact grooves for retention of said collimator frame within said transfer frame; and
   d. fastener release means on said collimator frame and camera permitting said collimator frame to be released from said camera.

2. The transfer system of claim 1 wherein said outer edge surfaces of said collimator frame are generally flat, said outer edge surfaces terminating in a generally flat side surface extending inwardly therefrom; and
   each of said transfer cart top and side frame supports includes an I-shaped support guide having a base surface and a side guide surface extending generally perpendicular therefrom, each side guide surface of said top and side support guides adapted to contact said side surface of said collimator frame whereby said side guide surfaces permit said transfer cart to move said locking discs into alignment with said grooves.

3. The transfer system of claim 2 wherein said transfer cart bottom frame support includes a vertically movable bottom lift plate, said lift plate having a flat top edge, a polyethylene support strip of generally rectangular cross-section configuration positioned on and extending the length of said top edge, said strip narrower than the width of said top edge, said bottom locking disc extending through said support strip; and said bottom outer edge surface of said collimator frame having a generally channel shaped recess formed in the center of said bottom outer edge surface and extending the length thereof with said bottom contact groove opening into said recess whereby said lift plate lifts said collimator frame by said support strip engaging said recess.

4. The transfer system of claim 3 wherein said base surface of said side support guide is adapted to contact one of said collimator frame side outer edge surfaces whereby said locking discs snap fully into said contact grooves, and said support strip being in contact with said collimator frame bottom outer edge surface while said base surface of said top support guide is normally slightly spaced from said collimator frame to outer edge surface.

5. The transfer system of claim 4 wherein said top locking disc is shaped with a circular edge biased to protrude from said transfer frame top support and said bottom locking disc is shaped with a circular edge biased to protrude from said support strip, and said grooves are shaped circular to conform to the outermost portion of said locking discs circular edge.

6. The transfer system of claim 5 further including means to raise and lower said bottom lift plate any variable distance within a fixed vertical travel distance, said fixed travel distance being about equal to the spring travel of said top locking disc.

7. The transfer system of claim 6 wherein said fixed travel distance is about ¼" whereby said transfer cart is effective to transfer said collimator frame with little movement.

8. The transfer system of claim 3 further including a storage rack for storage and retrieval of said collimator frame, said storage rack including at least one rack module with a vertically extending column having a top guide support and a bottom guide support, each rack guide support extending outwardly from said column, said top guide support including a spring biased locking disc, said collimator frame having a second contact groove formed in said top outer edge surface for receiving said top guide support locking disc; said bottom guide support including a left hand and a right hand support guide laterally spaced from one another a distance at least equal to the width of said lift plate support strip and extending at least the length of said collimator frame bottom outer edge surface, said bottom outer edge surface adapted to rest on said right and left hand support guides while said top guide support locking disc engages said second contact groove when said collimator frame is stored in said storage rack.

9. The transfer system of claim 8 further including right and left bottom gusset plates extending from said column and supporting said bottom guide support, each gusset plate having a plurality of fastener holes for securing a plurality of said rack modules side-by-side.

10. The transfer system of claim 9 further including a right hand outrigger stand and a left hand outrigger stand, each stand having a plurality of fastener holes aligned with said fastener holes in said gussets whereby said storage rack is supported by said column and said right and left hand outrigger stands.

11. The transfer system of claim 8 further including spring means biasing said right and left hand support guides towards one another, each of said right and left hand support guides having a tapered outer end for receiving said bottom lift plate support strip when said transfer cart moves a collimator frame into said storage rack.

12. The transfer system of claim 11 further including said top frame support having right and left hand support guides and spring means biasing said top right and left hand support guides towards one another.

13. A transfer mechanism for storing and retrieving collimators comprising:
   a) a rectilinear collimator frame within which said collimator is mounted, said frame having a thickness defined, at least in part, by an outer edge extending from one side of said collimator frame, said outer edge having a top outer edge surface and a bottom outer edge surface, said top outer edge surface having at least one contact groove formed therein;
   b) a storage rack for removably storing said collimator frame in a vertical position, said storage rack having at least one rack module with a vertically extending column having a top guide support and a bottom guide support, each rack guide support extending outwardly from said column, said top guide support having spring loaded contact means including a locking disc for slidingly engaging said top outer edge surface until snap locking in said groove whereby the weight of said collimator and said collimator frame is carried by said bottom guide support while said locking disc locks said collimator frame within said storage rack; and
   c) a transfer cart for releasably carrying said collimator frame in a vertical position by carrying said collimator frame on said top and bottom outer edge surfaces.

14. A transfer mechanism for changing the collimator of a nuclear camera comprising: a rectilinear collimator frame within which said collimator is mounted, said collimator frame having a thickness defined, in part, by an outer edge extending from one side of said collimator frame; a storage rack for removably storing said collimator frame in a vertical position by resting and clamping said collimator frame on said outer edge; and, a transfer cart for releasably carrying said collimator frame in a vertical position by carrying said collimator frame on said outer edge;
   said outer edge extends about said collimator frame and has top, bottom and side outer edge surfaces, said top and bottom outer edge surfaces having a groove formed therein;
   said transfer cart having a transfer frame, said transfer frame having generally parallel top and bottom supports and a fixed side support generally perpendicular to said top and bottom supports; and
   spring biased contact disc means including a top, spring biased locking disc extending from said top support and a bottom, spring biased locking disc extending from said bottom support for slidably engaging, respectively, said top and bottom outer edge surface until locking into said top and bottom grooves whereby said cart engages said collimator frame.

15. The transfer mechanism of claim 14 wherein said collimator frame thickness is totally defined by said outer edge and an inner edge extending from the other side of said collimator frame and closer to the center of said collimator frame than said outer edge; said outer edge surfaces extend from said one side of said collimator frame and terminate in a flat side surface extending inwardly and said inner edge extends from said side surface to said other side of said collimator frame, said inner edge having top and bottom and side inner edge surfaces;
   said transfer cart top and side frame supports include an L-shaped support guide having a base surface adapted to be moved adjacent to said outer edge surface and a side guide surface extending generally perpendicular from said base surface and adapted to be moved generally adjacent to said collimator frame flat side surface whereby alignment of said cart with said collimator frame is assured.

16. The transfer mechanism of claim 15 wherein said base surface of said side support guide is adapted to contact one of said collimator frame side outer edge surfaces whereby said locking discs snap fully into said grooves.

17. The transfer mechanism of claim 16 wherein said transfer cart bottom frame support includes a vertically movable bottom lift plate, said lift plate having a flat top edge, a polyethylene support strip of generally rectangular cross-section configuration positioned on and extending the length of said top edge, said strip narrower than the width of said top edge, said bottom locking disc extending through said support strip; and said bottom outer edge surface of said collimator frame having a generally channel shaped recess formed in the center of said bottom outer edge surface and extending the length thereof with said bottom groove opening into said recess whereby said lift plate lifts said collimator frame by said support strip engaging said recess.

18. The transfer mechanism of claim 17 wherein said top locking disc is shaped with a circular edge biased to protrude from said transfer frame top support and said bottom locking disc is shaped with a circular edge biased to protrude from said support strip, and said grooves are shaped circular to conform to the outermost portion of said locking discs circular edge.

19. The transfer mechanism of claim 17 wherein said storage rack includes at least one rack module with a vertically extending column having a top guide support and a bottom guide support, each rack guide support extending outwardly from said column, said top guide support including a spring biased locking disc, said collimator frame having a second groove formed in said top outer edge surface for receiving said top guide locking disc; said bottom guide support including a left hand and a right hand support guide laterally spaceable from one another a distance at least equal to the width of said lift plate support strip and extending at least the length of said collimator frame bottom outer edge surface, said bottom outer edge surface adapted to rest on said right and left hand support guides while said top guide support locking disc engages said second groove when said collimator frame is stored in said storage rack.

20. The transfer mechanism of claim 19 further including spring means biasing said right and left hand support guides towards one another, each of said right and left hand support guides having a tapered outer end for receiving said bottom lift plate support strip when said transfer cart moves a collimator frame into said storage rack.

21. The transfer mechanism of claim 17 further including means to raise and lower said bottom support any variable distance within a fixed vertical travel distance, said fixed travel distance being less than the spring travel of said top locking disc.

22. The transfer mechanism of claim 21 further including right and left bottom gusset plates extending from said column and supporting said bottom guide support, each gusset plate having a plurality of fastener holes for securing a plurality of said rack modules side-by-side.

23. The transfer mechanism of claim 22 further including a right hand outrigger stand and a left hand outrigger stand, each stand having a plurality of fastener holes aligned with said fastener holes in said gussets whereby said storage rack is supported by said column and said right and left hand outrigger stands.

24. A transfer cart for changing the collimator of a nuclear camera in which said collimator is mounted within a rectilinear collimator frame releasably secured to said camera, said collimator frame having top, bottom and side outer edges with a groove formed in said top and bottom outer edges, said transfer cart comprising:
a generally C-shaped collimator transfer frame, said transfer frame having generally parallel top and bottom supports and a side support generally perpendicular to said top and bottom supports; and
spring loaded contact disc means in said top support and said bottom support including a locking disc for slidingly engaging said top and bottom outer edges until snap locking in said grooves whereby the weight of said collimator is carried by said bottom support while said discs lock said collimator frame to said transfer frame.

25. The transfer cart of claim 24 wherein said outer edges of said collimator frame are generally flat, said outer edges terminating in a generally flat side surface extending inwardly therefrom; and
said top and side transfer frame supports includes an L-shaped support guide having a base surface and a side guide surface extending generally perpendicular therefrom, each side guide surface for all frame supports adapted to contact said side surface of said collimator frame whereby said side guide surfaces permit said transfer cart to move said locking discs into alignment with said grooves.

26. The transfer cart of claim 25 wherein said transfer cart bottom frame support includes a vertically movable bottom lift plate, said lift plate having a flat top edge, a polyethylene support strip of generally rectangular cross-section configuration positioned on and extending the length of said flat top edge, said strip narrower than the width of said flat top edge, said bottom locking disc extending through said support strip; and said bottom outer edge of said collimator frame having a generally channel shaped recess formed in the center of said bottom outer edge and extending the length thereof with said bottom groove opening into said recess whereby said lift plate lifts said collimator frame by said support strip engaging said recess.

27. The transfer cart of claim 26 wherein said top locking disc is shaped with a circular edge biased to protrude from said transfer frame top support and said bottom locking disc is shaped with a circular edge biased to protrude from said support strip, and said grooves are shaped circular to conform to the outermost portion of said locking discs circular edge.

28. The transfer cart of claim 27 further including means to raise and lower said bottom lift plate any variable distance within a fixed vertical travel distance, said fixed travel distance being about equal to the spring travel of said top locking disc.

29. The transfer cart of claim 28 wherein said fixed travel distance is about $\frac{1}{4}''$ whereby said transfer cart is effective to transfer said collimator with little movement.

30. A transfer system for changing the collimator of a nuclear camera rotatable by a gantry about the body of a patient, said transfer system comprising:
a. a rectilinear collimator frame containing a collimator releasably secured to the face of said camera, said collimator frame having a top and bottom and side outer edge surfaces with a contact groove formed in said top edge surface;
b. a hand pushable transfer cart having a generally C-shaped collimator transfer frame, said transfer frame having generally parallel top and bottom supports and a side support generally perpendicular to said top and bottom supports;
c. spring biased locking disc means including a top spring biased locking disc extending from said top support for slidingly engaging said top edge surface when said camera is rotated to position its collimator in a vertical position by movement of said transfer cart until snap locking said locking disc in said top contact groove for retention of said collimator frame within said transfer frame; and
d. fastener release means on said collimator frame and camera permitting said collimator frame to be released from said camera.

31. A transfer system for changing the collimator of a nuclear camera rotatable by a gantry about the body of a patient, said transfer system comprising:
a. a rectilinear collimator frame containing a collimator releasably secured to the face of said camera, said collimator frame having a top and bottom and side outer edge surfaces with a contact groove formed in said bottom edge surface;
b. a hand pushable transfer cart having a generally C-shaped collimator transfer frame, said transfer frame having generally parallel top and bottom supports and a side support generally perpendicular to said top and bottom supports;
c. spring biased locking disc means including a bottom spring biased locking disc extending from said bottom support for slidingly engaging said bottom edge surface when said camera is rotated to position its collimator in a vertical position by movement of said transfer cart until snap locking said locking disc in said bottom contact groove for retention of said collimator frame within said transfer frame; and
d. fastener release means on said collimator frame and camera permitting said collimator frame to be released from said camera.

* * * * *